United States Patent [19]

Pournain

[11] Patent Number: 4,792,754
[45] Date of Patent: Dec. 20, 1988

[54] DEVICE FOR PRODUCTION OF A TACHOMETRY SIGNAL OF INFINITE RESOLUTION AND WITHOUT RIPPLE FROM AN INDUCTIVE POSITION SENSOR

[75] Inventor: Michel Pournain, Muret, France

[73] Assignees: Regie Nationale Des Usines Renault; La Telemecanique Electrique; Bertrand Polico, all of Creteil, France

[21] Appl. No.: 942,372

[22] Filed: Dec. 16, 1986

[30] Foreign Application Priority Data

Dec. 16, 1985 [FR] France .................... 85 18629

[51] Int. Cl.$^4$ ............................................. G01P 3/48
[52] U.S. Cl. ................................... 324/166; 361/240
[58] Field of Search ..................... 324/166; 361/240

[56] References Cited

U.S. PATENT DOCUMENTS

| 3,501,651 | 3/1970 | Cottrell | 318/326 X |
| 4,011,440 | 3/1977 | Steglich | 235/183 |
| 4,703,391 | 10/1987 | Franzolini | 361/240 |

FOREIGN PATENT DOCUMENTS 0127890 12/1984 European Pat. Off. .
0148518 7/1985 European Pat. Off. .

Primary Examiner—A. D. Pellinen
Assistant Examiner—Morris Ginsburg
Attorney, Agent, or Firm—Oblon, Fisher, Spivak, McClelland, & Maier

[57] ABSTRACT

A device for the production of a tachometry signal of infinite resolution and without ripple from an inductive position sensor. The sensor is fed by a sinusoidal reference signal and supplies two phase signals. A resistance-capacitance circuit tuned to the frequency of the reference signal is fed by the two phase signals of the sensor and supplies a sinusoidal signal whose phase angle is proportional to the rotation of the sensor. This signal is then digitized and processed by digital phase comparators and low-pass filters before differentiation. This includes the use of particular digital phase comparators, each associated with a particular return to zero detector, to produce by a storage flip-flop and an electronic switch, the outgoing tachometry signal with the aid of a single differentiator with a device for elimination of discontinuities.

4 Claims, 5 Drawing Sheets 4,792,754

DEVICE FOR PRODUCTION OF A TACHOMETRY SIGNAL OF INFINITE RESOLUTION AND WITHOUT RIPPLE FROM AN INDUCTIVE POSITION SENSOR

BACKGROUND OF THE INVENTION

1. Field of the Invention

The invention relates generally to high-precision servomechanisms, and more particularly to selfsynchronizing motors in servomechanisms.

2. Discussion of Background

These servomechanisms often use a selfsynchronizing motor without brushes which requires the use of an inductive sensor for the determination of the position of the rotor. Moreover, the use of the servomechanism requires a tachometer to determine at any moment the exact rotation speed of the rotor. Therefore, it is tempting to try to avoid the duplication of equipment and to determine the speed directly from the resolver. Generally the problem therefore occurs of generating a tachometry signal from an inductive sensor such as a resolver (biphase), a synchro (triphase) or an Inductosyn (linear displacement).

To solve this problem a device is already known, described in particular in European application No. 127 890. This prior device uses an RC circuit driven by the two signals of phases of the inductive sensor, itself fed by a sinusoidal reference signal. This RC circuit generates a sinusoidal analog signal whose phase angle is rigorously equal to the angular shift of the rotor of the sensor in relation to the stator. This analog signal then is digitized by a trigger circuit or the like to supply a square-wave input signal. Further, the oscillator which supplies said reference signal is made also to supply a second reference signal out of phase by $\pi/2$, these two reference signals also being digitized.

Moreover, this device uses two digital phase comparators consisting essentially of two exclusive OR gates respectively comparing said input signal and one of the two reference signals to generate two square-wave width modulation signals with alternately increasing and decreasing widths. These signals are separately filtered and shunted to generate a trapezoidal signal as well as this same signal out of phase by $\pi/2$, these two latter signals themselves being separately processed by inverters to obtain finally four trapezoidal signals out of phase by $\pi/2$ whose amplitudes are proportional to the speed of rotation. Finally the device comprises a complex logic which, starting from the two filtered signals, samples from each of the four preceding trapezoidal signals the two central quarters of each half period.

However, if a correct tachometry signal is desired, it is necessary to pair the components of the two ways. In adjustment to zero of the two shunting devices and also an adjustment to zero of the two inverters is also necessary, as otherwise there would be obtained, for example, for a constant rotation speed of nonconstant tachometry, a signal over a rotation.

SUMMARY OF THE INVENTION

Accordingly, one object of this invention is to achieve a novel device that also generates a tachometry signal from the two phase signals of an inductive sensor.

Another object of this invention is to provide a novel device which is simpler and especially does not require any adjustment or component pairing.

This invention is obtained like the previous device in a standard way using an RC circuit and a trigger circuit for producing the digitized main input signal, but it is distinguished from it by the fact that:

each of the two digital phase comparators generating a square-wave width modulation signal consists of a circuit of simple flip-flops to establish the corresponding width modulation signal for each transition from a determined direction of an input signal of the comparator, and to interrupt it for each transition from a determined direction of the other input signal of the comparator, the two input signals of the comparator considered being the reference signal and the main signal for one of the comparators, and for the other comparator these same signals including a transit through an inverter to replace it by its complement;

with each digital phase comparator is associated a return to zero detector consisting of another flip-flop circuit made to establish a corresponding return to zero signal when there are achieved conditions of passage of the square-wave width modulation signal from one state to another and this square-wave width modulation signal is already in the other state;

the two return to zero signals thus generated drive a storage flip-flop which produces a selection signal;

a switch is controlled by said selection signal to sample, in each of the square-wave width modulation signals after passage in a low-pass filter, the second half of each cycle alternately of one or the other signal to obtain a single sawtooth signal; and a single differentiator generates the tachometry signal from this single sawtooth signal, with devices for elimination of discontinuities.

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
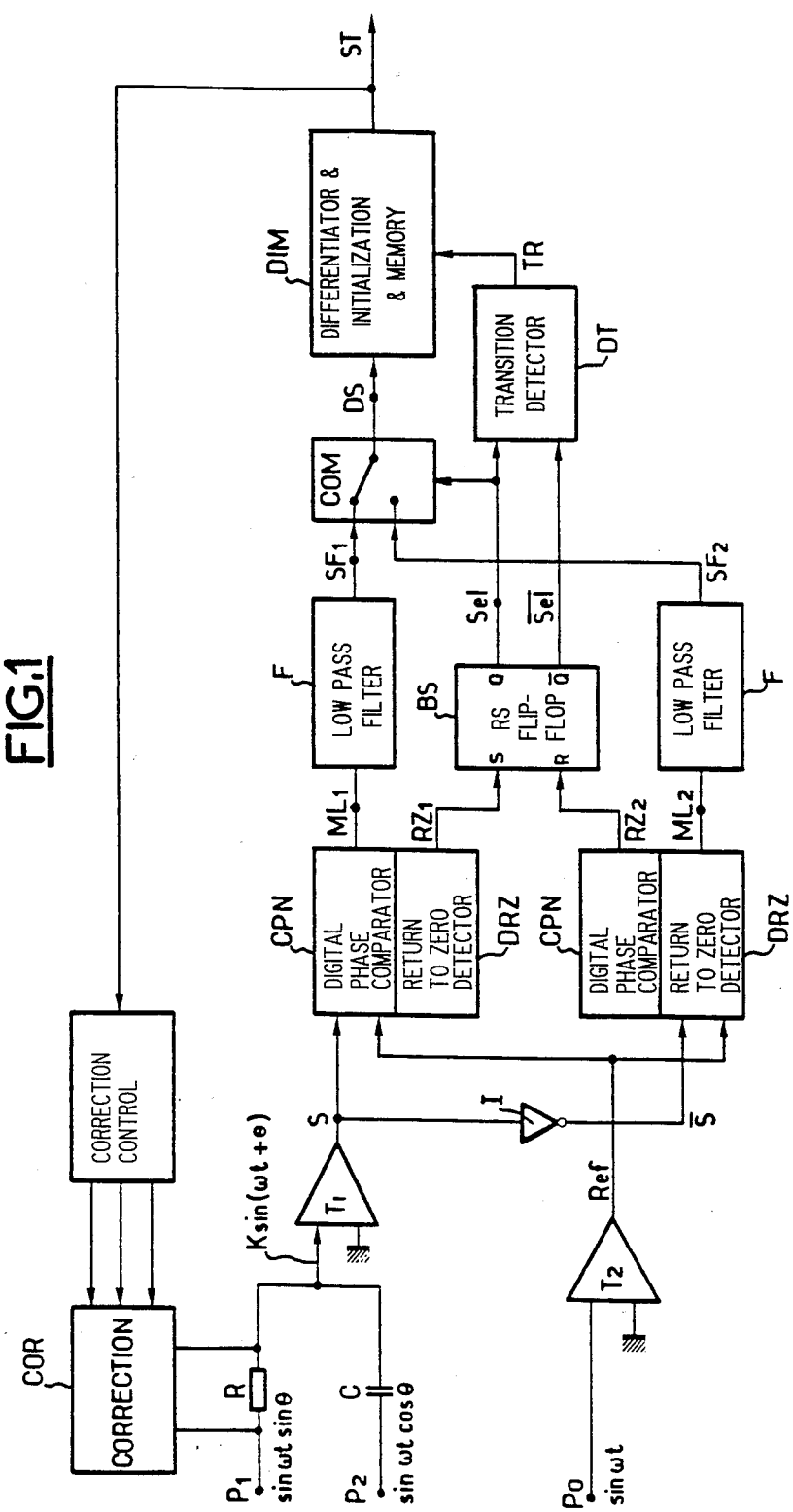
FIG. 1 is a block diagram of the device.

Various other objects, features and attendant advantages of the present invention will be more fully appreciated as the same becomes better understood from the following detailed description when considered in connection with the accompanying drawings in which like reference characters designate like or corresponding parts throughout the several views and wherein the inductive position sensor, or synchroresolver, not shown, is fed by a sinusoidal oscillator, not shown, of perfectly stable clock rate or pulse frequency w. This sinusoidal signal is also fed to input Po of the device, while the two phase signals of the two-phase sensor are fed to inputs P1 and P2 of this same device. In a standard way an RC circuit is mounted between P1 and P2 and supplies a sinusoidal signal of clock rate or pulse frequency w and phase angle θ in relation to signal Po. This sinusoidal signal is digitized in a trigger circuit T1 and supplies a main signal S in the form of relatively regular square waves, because θ varies only very slowly in relation to pulse frequency w.

In the same way the initial sinusoidal signal Po is digitized by a second trigger circuit T2 which gives a reference signal Ref, also in regular square waves having a similar width. Finally, FIG. 1 shows the presence of an inverter I which transforms signal S into its complement $\bar{S}$.

Figure 2:
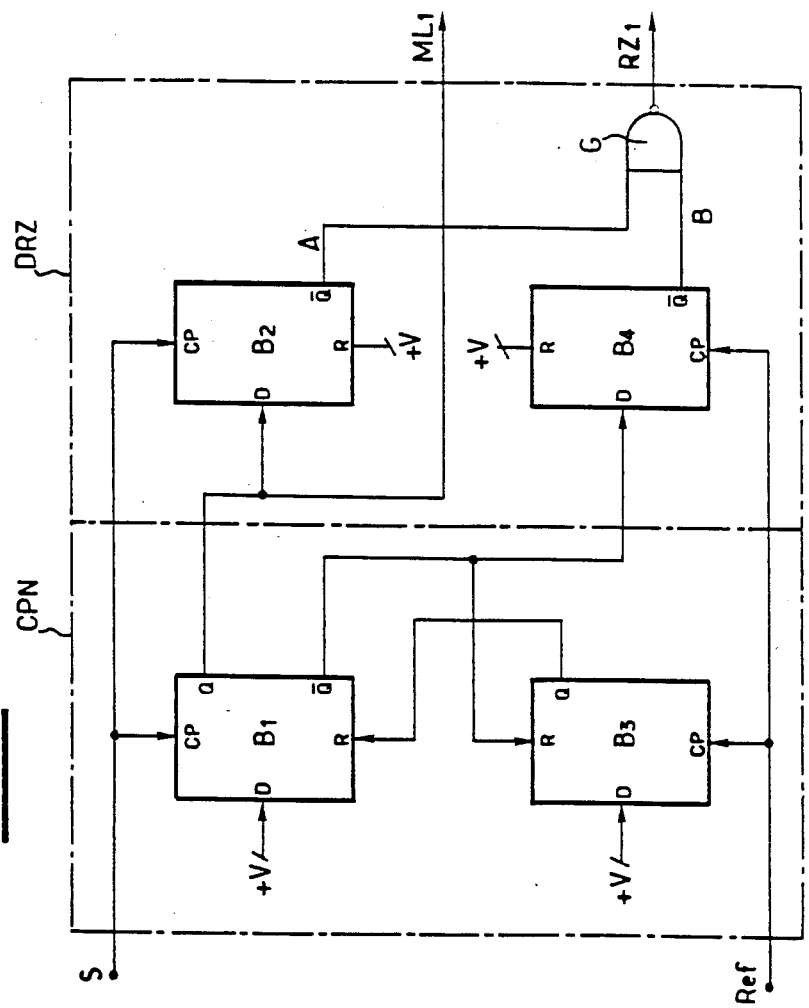
FIG. 2 is a detailed block diagram of one of the digital phase comparators and return to zero detectors of FIG. 1.

According to one of the essential features of the invention, the signals Ref and S, as well as Ref and $\bar{S}$ are compared separately in two digital phase comparators CPN, each associated with a return to zero detector DRZ. The details of these units are shown in FIG. 2. Each consists essentially of four type D flip-flops, referenced B1 to B4, which are coupled as indicated in the diagram.

Flip-flop B1 is set by the positive transitions of S arriving at clock input CP, producing a signal at Q, having a square-wave width modulation output ML1. Flip-flop B3, on the other hand, is set by the positive transitions of Ref arriving by its clock input CP producing a signal at its direct output. Q is connected to reset R of B1, causing the interruption of signal ML1. Flip-flop B3 in turn is reset by the complementary output $\bar{Q}$ of B1 which drives its reset R.

Since, as was seen above, the widths of the square waves of S and Ref are very close in size, the level transitions correspond approximately one for one, i.e., in general when a positive pulse of S arrives, flip-flop B1 has been previously set to the zero state, so that data input D of B2 is at zero at the moment this pulse arrives, which has the effect of maintaining output $\bar{Q}$ of B2 (referenced A) in state 1. Also when a pulse Ref arrives on clock input CP of flip-flop B4, this latter generally has its data input D at zero, so that its output $\bar{Q}$ (referenced B) remains in state 1. The NOT AND gate, referenced G, therefore normally keeps output signal RZ1 (reset to zero) at zero.

Figure 4:
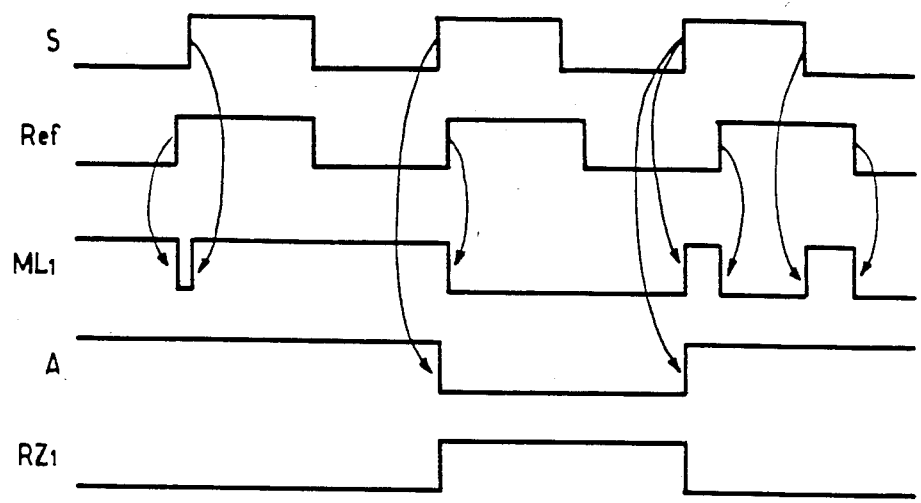
FIGS. 4 and 5 are timing diagrams illustrating the functioning of the device of FIG. 2, respectively for a positive speed and a negative speed of the rotor of the inductive sensor.
Figure 5:
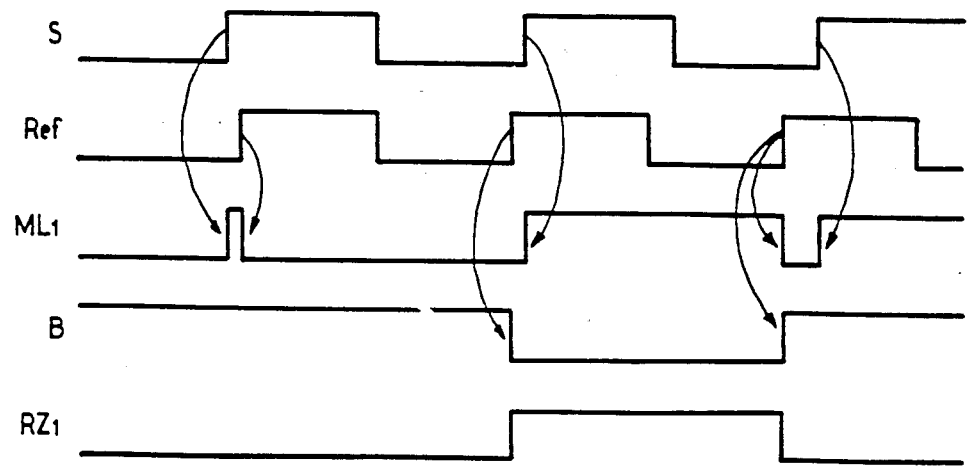

However, when S and Ref are close to coinciding, it happens, as shown in FIG. 4, that a positive transition of S arrives on B2 before a positive pulse of Ref occurs causing the resetting of B1 from the preceding positive pulse of S. In this case, data input D of flip-flop B2 will be in state 1 when pulse S arrives at its control input CP, which has the effect of setting A to the zero state, therefore putting RZ1 in state 1 as appears on the timing diagrams of FIG. 4, which corresponds to one direction of rotation of the sensor. The same explanation applies to the other direction of the sensor with flip-flop B4 and input B of G, which corresponds to the timing diagram of FIG. 5.

All the above relates to digital phase comparator CPN and return to zero detector DRZ of the upper part of FIG. 1, and applies identically to the similar unit of the lower part of FIG. 1, aside from replacement of signal S by signal $\bar{S}$. This signal, taking into account the nature of the signals, is the same as a signal out of phase by π, with the outgoing signals, moreover, having subscripts 2 instead of the subscript 1.

Figure 6:
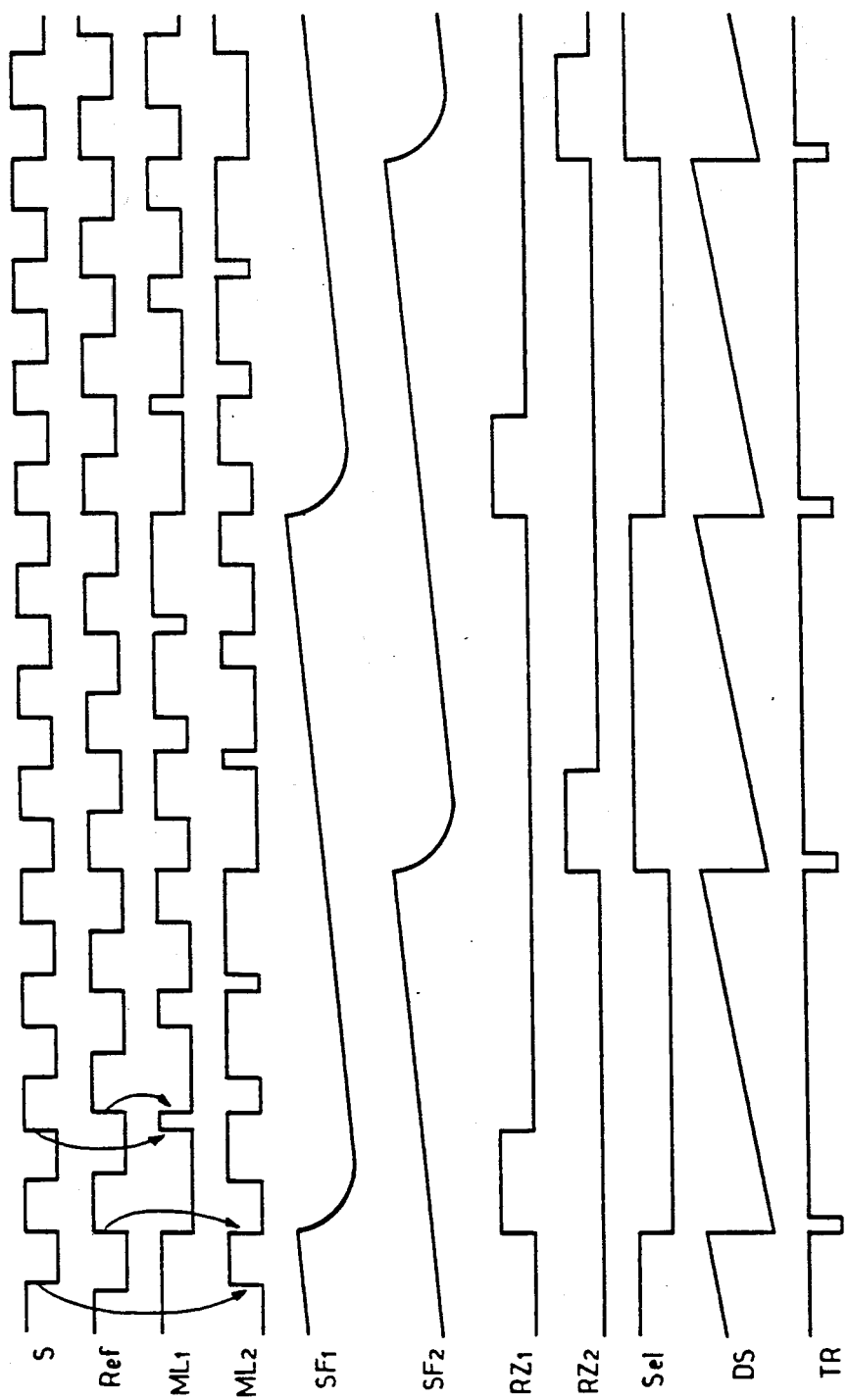
FIG. 6 is a timing diagram of the functioning of the whole device.

The square-wave width modulation signals ML1 and ML2 are each filtered through a low-pass filter F, and thus give rise to filtered signals SF1 and SF2 respectively, whose timing diagram is seen in FIG. 6. For their part, return to zero signals RZ1 and RZ2 drive the inputs S (set) and R (reset) of an RS type flip-flop, referenced BS, which stores the last return to zero and produces at its direct output Q a selection signal Sel. Thus controls a switch COM which selects, as appears on the timing diagrams of FIG. 6, alternately signals SF1 and SF2 so as to sample the second half of these signals, i.e., the strictly linear part of the signal, thus eliminating the first half of each sawtooth whose linearity is affected by the enable time of the filters.

Thus there is obtained at output DS of this switch a single sawtooth signal represented in the timing diagram of FIG. 6. At the same time, a transition detector DT sensitive to the positive or negative transitions of Sel, or again to the positive transitions of Sel and of $\overline{Sel}$ produces transition signals TR, also represented on the timing diagram of FIG. 6 and whose position corresponds to the discontinuities of signal DS.

It should be noted that single sawtooth signal DS is of rising or falling sawteeth depending on the direction of rotation of the sensor, and therefore it suffices to differentiate this single signal to determine the desired tachometry signal, in magnitude and sign, while taking care, however, to eliminate the discontinuities due to the transitions of DS.

Figure 3:
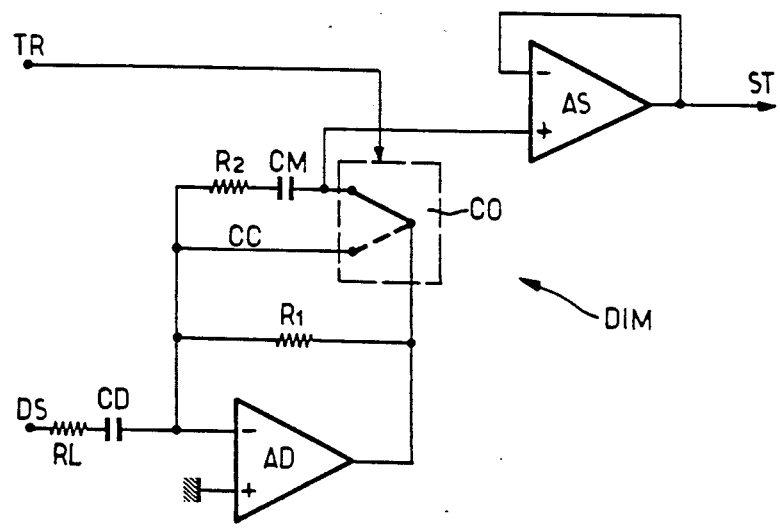
FIG. 3 is a diagram of the differentiator with its initiation and storage devices of FIG. 1.

For this it is possible, for example, to use the differentiation circuit DIM with initialization and memory represented in FIG. 3, where is seen an operational amplifier AD mounted as a differentiator with a resistor R1, a differentiation capacitor CD and a current limitation resistor RL which is charged by signal DS. The direct input of amplifier AD is grounded, so that its reversing input is also set to the zero potential by the circuit indicated, while the output of amplifier AD is at a potential proportional to the desired tachometry signal.

An electronic switch CO, controlled directly by signal TR, normally turns on this circuit with a memory capacitor CM and its load resistor R2, this capacitor therefore remaining constantly charged at a voltage representative of the tachometry signal. This signal, sampled between CM and CO, is sent to a tracking amplifier AS which supplies the outgoing tachometry signal ST while introducing a high impedance at the output of capacitor CM. When a pulse is present on transition signal TR, switch CO therefore switches off the circuit of the memory capacitor, this latter continuing to supply the voltage stored in memory to the tracking amplifier. At the same time this switch turns on, as indicated by its position represented in broken lines in FIG. 3, a short-circuit connection CC forces at initialization the differentiation circuit to discharge or charge the differentiation capacitor and allow another cycle to begin. The device thus assures a perfect continuity of tachometry signal ST.

Thanks to the use of a single differentiator, it is seen that no pairing of components nor any zero or other balancing adjustment is necessary and the circuit, which is moreover relatively simple, does not need any adjustment.

The precision of the tachometry signal obtained depends, as mentioned above, on the fact that pulse frequency w of the reference signal is sufficiently close to the frequency of rotation of the sensor. If this is not the case, or if it is desired to improve the precision still more, it is possible to add, as shown in FIG. 1, a correction circuit COR which takes into account the derivative of the position generated by circuit RC, by selecting values R and C so that $R.C = (1/w)\cdot(1 - W/w)$.

This correction of R or C can be achieved either by a digital means, such as a network of resistors or capacitors switched for different rotation speeds, or by an analog means such as a variable gain amplifier or a diode with variation of capacity.

Obviously, numerous modifications and variations of the present invention are possible in light of the above teachings. It is therefore to be understood that within the scope of the appended claims, the invention may be practiced otherwise than as specifically described herein.

I claim:

1. A device for production of a tachometry signal of infinitely fine resolution and without ripple from an inductive position sensor fed by a sinusoidal reference signal and supplying two phase signals, comprising:
   a resistance-capacitance circuit tuned to the frequency of the reference signal, said resistance-capacitance circuit connected to said stwo phase signals and supplying a sinusoidal signal whose phase angle is proportional to a rotation of the sensor;
   digitizing means connected to said resistance-capacitance circuit and said sinusoidal reference signal for converting said sinusoidal signal and said sinusoidal reference signal to first and second digital signals;
   inverter means connected to said digitizing means for producing a third digital signal which is the inverse of said first digital signal;
   a plurality of digital phase comparators connected to said digitizing means, each generating a square-wave width modulation signal and consisting of a circuit of simple flip-flops which produce a corresponding square-wave width modulation signal beginning with each transition from a determined direction of an input signal and ending with each transition from a determined direction of said second digital signal, said input signal being said first digital signal in at least one digital phase comparator and being said third digital signal in at least one additional digital phase comparator;
   each digital phase comparator having associated therewith a return to zero detector consisting of another flip-flop circuit which produces a corresponding return to zero signal when there occurs a transition in the input signal to begin the square-wave width modulation signal while the square-wave width modulation signal is already being produced;
   a storage flip-flop which produces a selection signal in response to said return to zero signals;
   a plurality of low pass filters each receiving one square-wave modulation signal to produce a filtered signal;
   an electronic switch controlled by the selection signal to sample from each of the filtered signals a second half of each cycle to obtain a single sawtooth signal; and
   a single differentiator with means for elimination of discontinuities for generating an outgoing tachometry signal from said single sawtooth signal.

2. A device according to claim 1, wherein each of the digital phase comparators and their associated return to zero detectors comprises four D-type flip-flops of which the first two have their clock input connected to their input signal and other two have their clock input connected to the second digital signal, the direct output of a first flip-flop being connected to the output of said digital phase comparator as said square-wave width modulation signal as well as to the data input of a second flip-flop, the direct output of a third flip-flop being connected to the reset input of the first flip-flop, the complementary output of the first flip-flop being connected to the data input of the fourth flip-flop as well as to the reset input of the third flip-flop, the outputs of the second flip-flop and of the fourth flip-flop being connected to a logic gate which supplies the return to zero signal.

3. A device according to one of claims 1 and 2, wherein said means for elimination of discontinuities includes a transition detector controlled by said selection signal and the single differentiator includes a memory circuit and a short-circuit connected alternately by an electronic switch controlled by said transition signal produced by the transition detector, said electronic switch having a rest position to achieve storage of the value of the tachometry signal in a capacitor, and a short-lived active position corresponding to each transition to produce an initialization of the differentiator.

4. A device according to one of claims 1 and 2, further comprising a correction control means for receiving the tachometry signal and for readjusting the balancing of the input resistance-capacitance circuit.

* * * * *